United States Patent [19]

Katoh et al.

[11] Patent Number: 5,402,641
[45] Date of Patent: Apr. 4, 1995

[54] EXHAUST GAS PURIFICATION APPARATUS FOR AN INTERNAL COMBUSTION ENGINE

[75] Inventors: Kenji Katoh, Shizuoka; Shinichi Takeshima, Susono; Toshiaki Tanaka, Numazu; Satoshi Iguchi, Mishima; Masato Goto, Susono; Tetsuro Kihara, Susono; Takamitsu Asanuma, Susono; Fumitada Murakami, Susono, all of Japan

[73] Assignee: Toyota Jidosha Kabushiki Kaisha, Toyota, Japan

[21] Appl. No.: 94,799

[22] Filed: Jul. 20, 1993

[30] Foreign Application Priority Data

Jul. 24, 1992 [JP] Japan .................................. 4-198224
Jun. 30, 1993 [JP] Japan .................................. 5-162778

[51] Int. Cl.6 .................................................. F01N 3/20
[52] U.S. Cl. ........................................ 60/285; 60/277; 60/297; 60/301
[58] Field of Search .................. 60/277, 285, 297, 301

[56] References Cited

U.S. PATENT DOCUMENTS

| | | |
|---|---|---|
| 3,303,003 | 2/1967 | Zimmer . |
| 3,795,730 | 3/1974 | Kalvinskas . |
| 3,926,590 | 12/1975 | Aibe et al. . |
| 4,615,173 | 10/1986 | Usui et al. . |
| 4,729,220 | 3/1988 | Terasaka ............... 60/277 |
| 4,760,044 | 7/1988 | Joy, III et al. . |
| 4,780,447 | 10/1988 | Kim et al. . |
| 4,843,056 | 6/1989 | Matsumoto et al. ........... 502/302 |
| 4,868,148 | 9/1989 | Henk et al. . |
| 5,041,407 | 8/1991 | Williamson et al. . |
| 5,060,473 | 10/1991 | Nakagawa ............... 60/277 |
| 5,090,200 | 2/1992 | Arai . |
| 5,116,800 | 5/1992 | Williamson et al. . |
| 5,129,228 | 7/1992 | Kondo ............... 60/277 |
| 5,189,876 | 3/1993 | Hirota et al. . |
| 5,207,990 | 5/1993 | Sekiya et al. . |
| 5,211,010 | 5/1993 | Hirota ............... 60/277 |

FOREIGN PATENT DOCUMENTS

| | | |
|---|---|---|
| 0492989 | 1/1992 | European Pat. Off. . |
| 0503882 | 3/1992 | European Pat. Off. . |
| 3509359 | 9/1986 | Germany . |
| 53-115687 | 9/1978 | Japan . |
| 61-111127 | 5/1986 | Japan . |
| 62-106826 | 5/1987 | Japan . |
| 62-117620 | 5/1987 | Japan . |
| 1030643 | 1/1989 | Japan . |
| 1-30643 | 2/1989 | Japan . |
| 2149715 | 6/1990 | Japan . |
| 3135417 | 6/1991 | Japan . |
| 5-76771 | 9/1991 | Japan . |
| 4-171215 | 6/1992 | Japan . |
| 93/07363 | 4/1992 | WIPO . |
| 9201279 | 6/1993 | WIPO . |
| 9201330 | 7/1993 | . |
| 9201710 | 7/1993 | WIPO . |

OTHER PUBLICATIONS

Catalyst Journal, vol. 33, No. 2–Dec. 1991, pp. 87–90.
Journal of Solid State Chemistry 91, pp. 176–179 (Nov. 1991).
J. Chem. Soc., Chem. Commun., May, 1990, pp. 1165–1166.
Ser. No. 07/967,599, Oct. 1992 Takeshima et al.

Primary Examiner—Douglas Hart
Attorney, Agent, or Firm—Kenyon & Kenyon

[57] ABSTRACT

An NOx absorbent is installed in an exhaust conduit of an internal combustion engine capable of fuel combustion at lean air-fuel ratios. An oxygen concentration is repeatedly or continuously decreased by, for example, switching the air-fuel from the lean air-fuel ratio to a stoichiometric or rich air fuel ratio when the exhaust gas temperature is higher than 550° C. or when NOx absorbent temperature is higher than 500° C. As a result, the SOx absorbed in the NOx absorbent during lean air-fuel ratio, low temperature operation is released from the NOx absorbent, and the SOx-poisoned NOx absorbent is recovered.

25 Claims, 15 Drawing Sheets

EXHAUST GAS PURIFICATION APPARATUS FOR AN INTERNAL COMBUSTION ENGINE

BACKGROUND OF THE INVENTION

1. Field of the Invention

The present invention relates to an exhaust gas purification apparatus for an internal combustion engine installing an NOx (nitrogen oxides) absorbent in an exhaust conduit of the engine, and particularly relates to an exhaust gas purification apparatus capable of recovering an NOx absorbent poisoned by sulfur oxides (SOx).

2. Description of the Related Art

Internal combustion engines capable of fuel combustion at lean air-fuel ratios (lean burn engines) have been noted as engines which can both improve fuel economy and suppress the exhaust of $CO_2$. However, since a conventional catalyst (three-way catalyst) cannot purify NOx in exhaust gas from an engine operated at lean air-fuel ratios (that is, in exhaust gas including excess oxygen), catalysts or systems that can suppress the exhaust of NOx into the atmosphere even at lean air-fuel ratios are desired.

For example, Japanese Patent Application HEI 4-73264 filed Feb. 25, 1992 proposes an exhaust gas purification apparatus wherein an NOx absorbent including lanthanum (La), which is one kind of rare-earth, and platinum (Pt) is installed in an engine exhaust conduit. In the apparatus, NOx is absorbed by the La during an engine operation at lean air-fuel ratios, and the NOx absorbed by the La is released from the La at an engine operation at a stoichiometric or rich air-fuel ratio and is decomposed (or reduced) into $N_2$.

However, it has been found in tests executed for developing the present invention that if a high temperature and excess oxygen exhaust gas condition continues for a relatively long time period, the NOx absorption rate of the NOx absorbent decreases.

One reason for such degradation of the NOx absorbent is presumed to be that SOx (for example, $SO_2$ which is produced from sulfur contained in fuel) is oxidized to sulfate ion ($SO_4^{2-}$), which is diffused into and is absorbed by the NOx absorbent to form an obstinate sulfate which obstructs the absorption of NOx by the NOx absorbent.

SUMMARY OF THE INVENTION

An object of the invention is to provide an exhaust gas purification apparatus for an internal combustion engine installing an NOx absorbent in an engine exhaust conduit wherein the NOx absorbent poisoned by SOx is recovered to a nearly original non-poisoned state by controlling an operation of the engine.

The above-described object is achieved by an exhaust gas purification apparatus for an internal combustion engine in accordance with the present invention. The present invention is directed to an internal combustion engine capable of fuel combustion at lean air-fuel ratios and an exhaust conduit connected to the engine, an NOx absorbent installed in the exhaust conduit, including at least one kind of element selected from the group consisting of alkaline earth, rare-earth, and alkaline metals or an oxide of the element, wherein the NOx absorbent absorbs NOx in exhaust gas including excess oxygen and releases the NOx which the NOx absorbent has absorbed when an oxygen concentration of the exhaust gas decreases. The apparatus further includes operating condition detecting means for detecting an operating condition of the engine, operating condition determining means for determining whether the exhaust gas from the engine is in a condition wherein the exhaust gas includes excess oxygen and wherein the exhaust gas or NOx absorbent temperature is high, and exhaust gas oxygen concentration control means for decreasing the oxygen concentration of the exhaust gas flowing to the NOx absorbent when the operating condition determining means determines that the exhaust gas is in a condition wherein the exhaust gas includes excess oxygen and wherein the exhaust gas or NOx absorbent temperature is high.

In tests conducted conducted for developing the invention, the following facts were found: When the exhaust gas included excess oxygen (exhaust gas from the engine operated at lean air-fuel ratios) and when the exhaust gas or NOx absorbent temperatures were high (for example, higher than 550° C. in exhaust gas temperature), sulfate (for example, $BaSO_4$) was formed in the NOx absorbent carrying barium (Ba, one kind of alkaline earth) and the NOx absorbent was poisoned by SOx (SOx-poisoned). When the SOx-poisoned NOx absorbent was burnt in air at about 1100° C., the sulfate was decomposed to $SO_2$, and the $SO_2$ in the form of gas was released from the NOx absorbent, so that the NOx absorbent was recovered nearly to an original, non-poisoned state. When the SOx-poisoned catalyst was burnt in decompressed air, the sulfate was decomposed and the NOx absorbent was recovered even at about 900° C. Further, in a reducing gas condition (which corresponds to exhaust gas containing no oxygen but reducing materials such as hydrocarbons, and corresponds to, for example, exhaust gas from an engine operated at lean-air fuel ratios), the sulfate was decomposed and the NOx absorbent was recovered even at about 550° C. in exhaust gas temperature.

The above-found facts are used in the apparatus of the invention for recovering the NOx absorbent installed in the engine exhaust conduit from the SOx-poisoning thereof. More particularly, when the operating condition determining means determines that the engine exhaust gas is in a condition of excess oxygen and the engine exhaust or NOx absorbent temperature is high, the oxygen concentration control means decreases the oxygen concentration of the exhaust gas repeatedly or continuously. When the oxygen concentration decreases, the sulfate formed in the NOx absorbent is decomposed and is released from the NOx absorbent so that the NOx absorbent is recovered.

BRIEF DESCRIPTION OF THE DRAWINGS

The above-described object and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENTS

Preferred embodiments of the invention will be explained below with reference to drawings.

Figure 1:
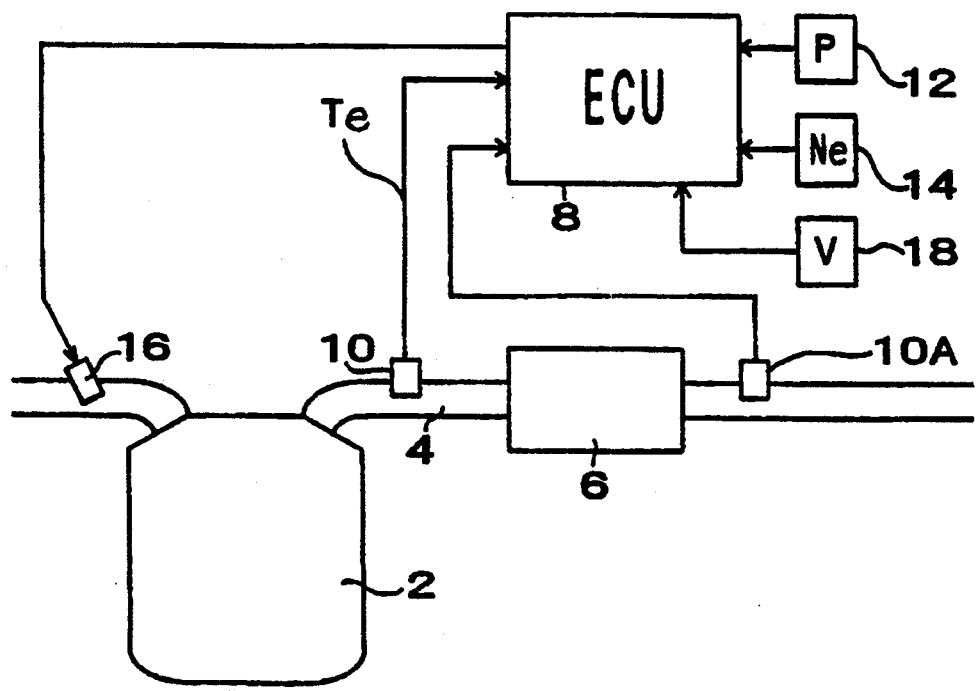
FIG. 1 is a schematic diagram of an exhaust gas purification apparatus for an internal combustion engine including an NOx absorbent, which is applicable to all embodiments of the invention.

Firstly, structures common to all embodiments of the invention will be explained with reference to FIGS. 1-4. As illustrated in FIG. 1, in an exhaust conduit 4 connected to an internal combustion engine 2 capable of fuel combustion at lean air-fuel ratios, an NOx absorbent 6 is installed which absorbs nitrogen oxides (NOx) in exhaust gas including excess oxygen and releases the NOx which the absorbent has absorbed when an oxygen concentration of the exhaust gas decreases.

The NOx absorbent 6 includes a carrier 6c of, for example, alumina ($Al_2O_3$) and at least one element 6b selected from the group consisting of (a) noble metal catalyst 6a having oxidizing and reducing abilities, for example platinum (Pt) and a mixture of platinum and rhodium (Rh), (b) alkaline earth, for example barium (Ba), (c) rare-earth, for example lanthanum (La), and (d) alkaline metal, for example kalium (K), or an oxide of the element, each carried by the carrier 6c. The above-described element 6b carried by the carrier 6c may be replaced by a transition metal, for example copper (Cu).

Figure 2:
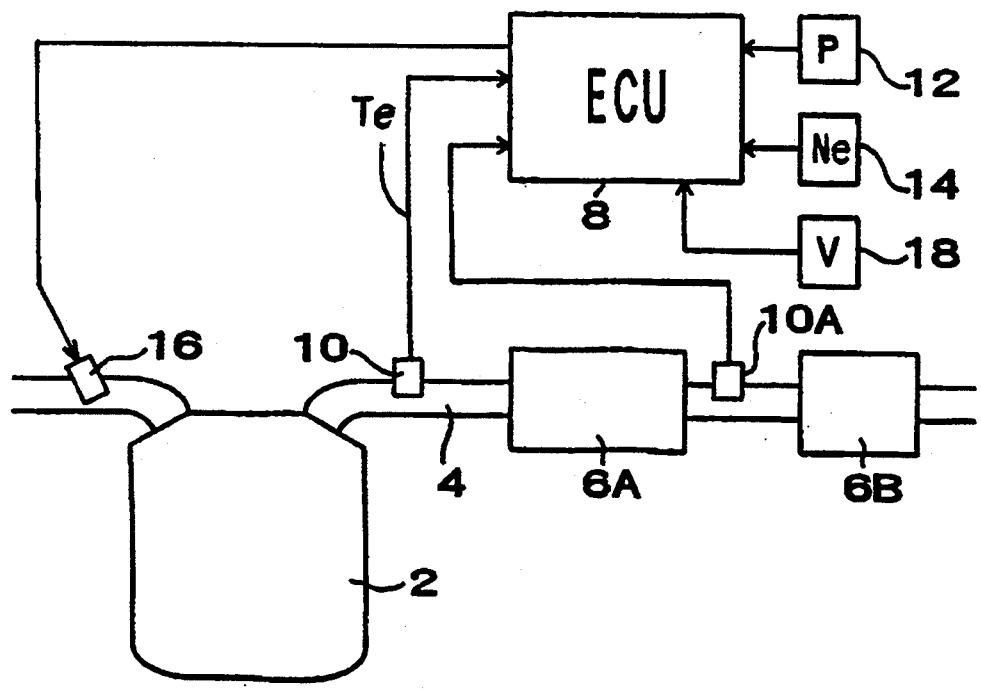
FIG. 2 is a schematic diagram of an exhaust gas purification apparatus wherein an NOx absorbent system includes a combination of an NOx absorbent and a conventional three-way catalyst, which is applicable to all the embodiments of the invention.

The NOx absorbent 6 of FIG. 1 may be replaced, as illustrated in FIG. 2, by a combination of an NOx absorbent 6A having a weak catalytic ability and a conventional, three-way catalyst 6B disposed downstream of the NOx absorbent 6A. The NOx absorbent 6A may be constructed of, for example, a double oxide of (a) transition metal (for example, Cu) and (b) alkaline earth, rare-earth, or alkaline metal each having an NOx absorbing ability. Such absorbent 6A includes, for example, a Ba-Cu-O base absorbent.

Figure 3A:
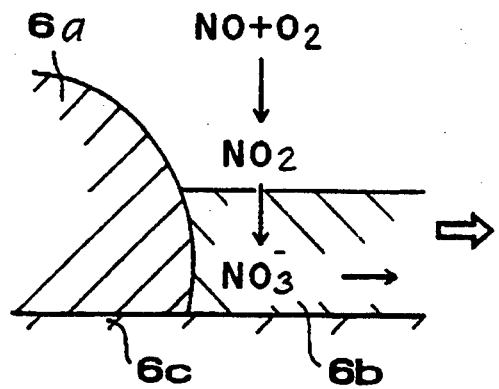
FIG. 3 is a diagram illustrating NOx absorption and release mechanisms of the NOx absorbent, which is applicable to all the embodiments of the invention.
Figure 3B:
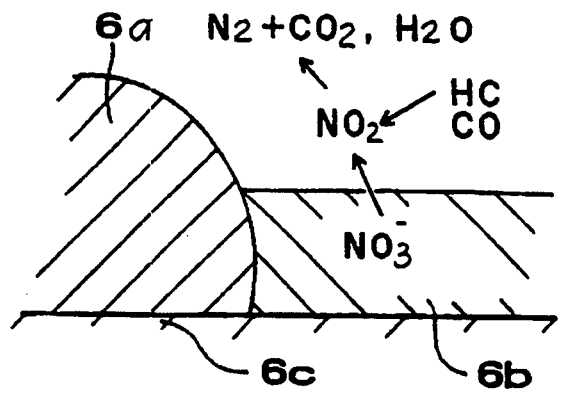

NOx absorption and release mechanisms of the NOx absorbent 6 are illustrated in FIG. 3. More particularly, in an excess oxygen exhaust gas condition, NO and $O_2$ react with each other at a surface of Pt to form $NO_2$, which is diffused into the Ba layer (more exactly, the layer of $Ba(OH)_2$, BaO) in the form of $NO_3^-$ so that NOx is absorbed by the Ba layer. In this instance, since NO has been oxidized to the form of $NO_2$, the NOx can easily react with Ba to be easily absorbed by the Ba layer. When the oxygen concentration of the exhaust gas decreases, the $NO_3^-$ which has been absorbed in the Ba layer is released from the Ba layer and is changed to the form of $NO_2$. The $NO_2$ is then reduced to $N_2$ by the reducing materials such as HC and CO contained in the exhaust gas at the surface of Pt.

Figure 4A:
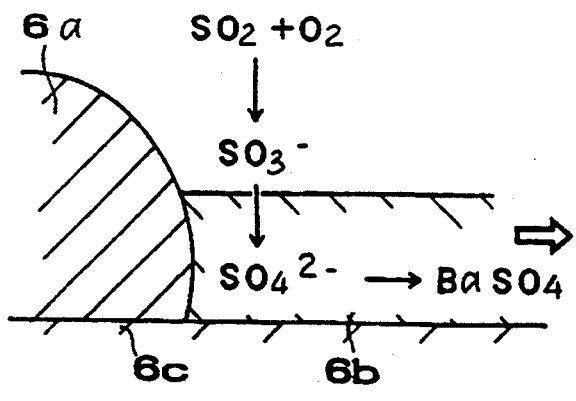
FIG. 4 is a diagram illustrating mechanisms of SOx-poisoning and recovery therefrom of the NOx absorbent, which is applicable to all the embodiments of the invention.
Figure 4B:
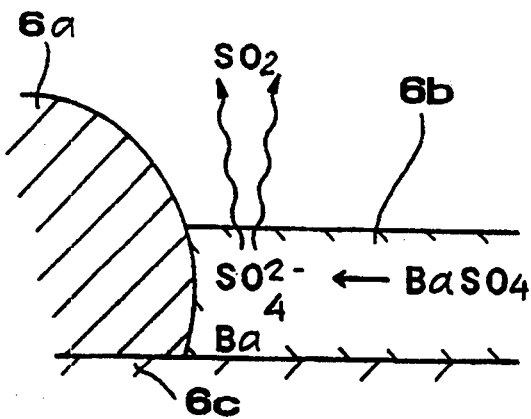

SOx-poisoning and recovery mechanisms of the NOx absorbent are illustrated in FIG. 4. As illustrated in the left half portion of FIG. 4, SOx in the exhaust gas (for example, $SO_2$) is oxidized to $SO_3^-$ and then to $SO_4^{2-}$ on the surface of Pt and the sulfate ion is diffused into the Ba layer to form sulfate (for example, $BaSO_4$). Since the sulfate grows unlikely to be decomposed with the lapse of time, the sulfate should be decomposed within a relatively short time period by decreasing the oxygen concentration of the exhaust gas, for example, by changing the air-fuel ratio to a rich air-fuel ratio. When the oxygen concentration of the exhaust gas decreases, as illustrated in the right half portion of FIG. 4, the sulfate is decomposed to a sulfate ion in the vicinity of Pt, which is in turn reduced to $SO_2$. The $SO_2$ is gas and is easily released from the Ba layer. By producing the oxygen concentration decreased condition repeatedly or continuously within a relatively short period of time, SOx-poisoning of the NOx absorbent 6 can be suppressed. For example, in a case of repeatedly producing the oxygen concentration decreased condition, an operation mode wherein the engine is operated at lean air-fuel ratios for about two minutes and then operated at rich air-fuel ratios for about one half ($\frac{1}{2}$) to three (3) seconds is repeated. In this instance, when the exhaust gas or NOx absorbent temperature is high, the time period wherein the rich air-fuel ratio is maintained can be shortened.

For conducting the recovery control from the SOx-poisoning of the NOx absorbent, various sensors and devices are provided. More particularly, exhaust gas sensors 10 and 10A are disposed in the exhaust conduit 4 upstream and downstream of the NOx absorbent 6, respectively, for the purpose of detecting the current exhaust gas temperature Te and the current NOx absorbent temperature. For the purpose of detecting the current engine operating condition, an engine load sensor (for example, an intake pressure sensor) 12 and an engine speed sensor 14 are provided. The engine speed Ne may be calculated from the output of a crank angle sensor housed in a distributor. These sensors 10, 12 and 14 constitute an operating condition detecting means for detecting the current engine operating condition. The outputs of these sensors 10, 12 and 14 are fed to an electronic control unit (ECU) 8.

The ECU 8 may be constituted of a micro computer. As with a conventional micro computer, the ECU 8 preferably includes input and output interfaces, a read-only memory (ROM), a random access memory (RAM) for storing data temporally, and a central processor unit (CPU) for conducting calculation. The ECU may further include an analog/digital convertor which converts analog signals to digital signals when the fed signals are analog ones. Instruction signals which are the results of calculation at the CPU are sent from the output interface to an exhaust gas oxygen concentration control means 16 to control the oxygen concentration of the exhaust gas. The exhaust gas oxygen concentration control means 16 includes, for example, an electronic control fuel injection valve which can control the air-fuel ratio by controlling an injection amount of fuel. For reference, the oxygen concentration of exhaust gas is 0.3–0.5% at the stoichiometric air-fuel ratio, about 4% at the air-fuel ratio of 18, and 7–7.5% at the air-fuel ratios of 22–23. Usually, lean burn engines can be operated at air-fuel ratios above 22.

Structures and operation specific to each embodiment will now be explained.

FIGS. 5–8 illustrate the first embodiment of the invention wherein an oxygen concentration of exhaust gas is decreased repeatedly when the exhaust gas is in a condition of excess oxygen and high temperature.

Figure 5:
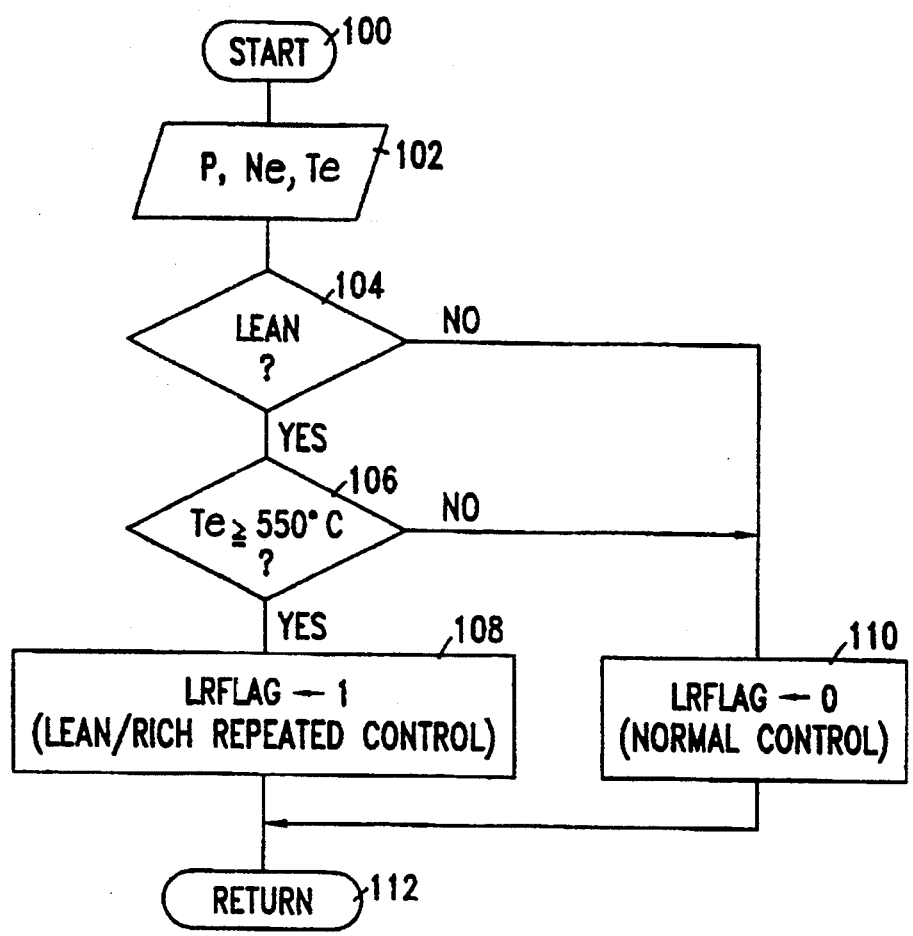
FIG. 5 is a flow chart of a control routine of an operating condition determining means in accordance with a first embodiment of the invention.
Figure 6:
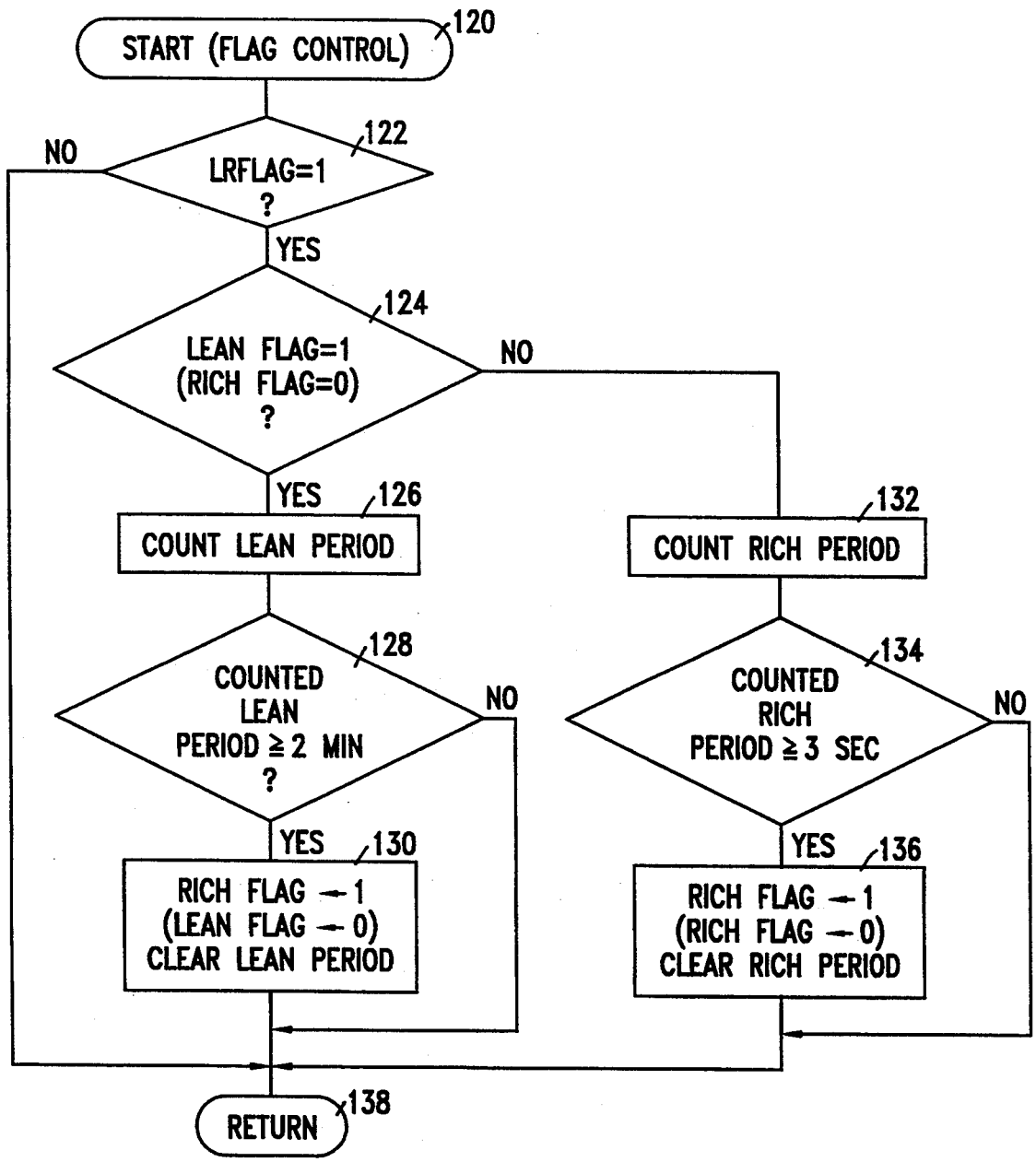
FIG. 6 is a flow chart of a flag control for repetition of lean and rich air-fuel ratio operations in accordance with the first embodiment of the invention.
Figure 7:
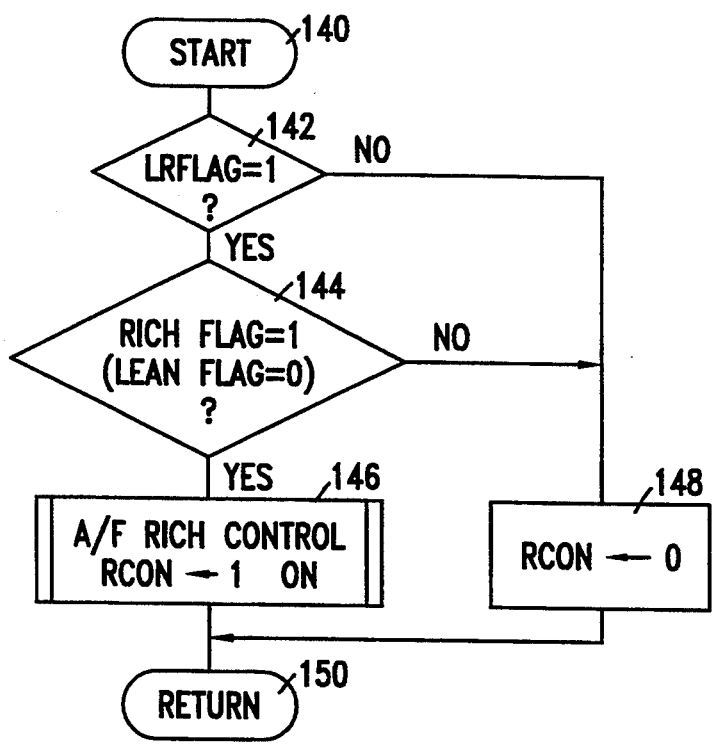
FIG. 7 is a flow chart of a control routine of a rich air-fuel ratio condition repeatedly producing means in accordance with the first embodiment of the invention.

Control routines as shown in FIGS. 5, 6 and 7 are provided for recovering an SOx-poisoned NOx absorbent 6. The control routines are stored in the ROM and called by the CPU where calculations are conducted in the order of calculations of FIGS. 5, 6, and 7. The routine of FIG. 5 constitutes an operating condition determining means of the first embodiment of the invention for determining whether or not the current exhaust gas condition is in a condition of excess oxygen and high temperature, and the routine of FIG. 7 constitutes an exhaust gas oxygen concentration control means of the first embodiment of the invention for decreasing the oxygen concentration of exhaust gas when the current exhaust gas condition is in a condition of excess oxygen and the exhaust gas or NOx absorbent temperature is high. This control means includes means for repeatedly producing a rich air fuel-ratio for controlling fuel injection so that the air-fuel ratio is repeatedly changed to a rich ratio.

The control routine of FIG. 5 is entered at predetermined time intervals. The routine of FIG. 5 is entered at step 100. Then, at step 102, the current engine operating conditions including an engine load P, an engine speed Ne, and an exhaust gas temperature Te are entered. An output of the exhaust gas temperature sensor 10 is used for the exhaust gas temperature. The exhaust gas temperature may be presumed from a map which stores the relationship between Te and P, Ne obtained tests. In a conventional fuel injection control, a fuel injection amount is determined based on P and Ne, and thus the air-fuel ratio has been determined before the routine proceeds to step 102.

Then, at step 104, a decision is made as to whether or not the current air-fuel ratio is lean (that is, greater than 14.7 in air-fuel ratio). If the air-fuel ratio is lean, the routine proceeds to step 106, where a decision is made as to whether or not the current exhaust gas temperature Te (or NOx exhaust gas temperature) is equal to or higher than a predetermined temperature (for example, 550° C. in exhaust gas temperature and 500° C. in NOx absorbent temperature). When the exhaust gas temperature is high, the current condition is deemed to be a condition in which the air-fuel ratio is controlled so that it repeatedly becomes rich and then lean thereby recovering the SOx-poisoned NOx absorbent, and the routine proceeds to step 108 where the lean and rich repeated control flag LRFLAG is set to "1". Then, the routine proceeds to step 112 where the cycle ends. When the exhaust gas is not in a condition of a lean air-fuel ratio and high temperature, the current operating condition is deemed to be a condition in which no recovery control of the NOx absorbent is to be conducted, and the routine proceeds to step 110 where flag LRFLAG is cleared to "0". Then, the routine proceeds to step 112 and the cycle ends.

The routine of FIG. 6 is a routine for conducting a flag control for the lean and rich air-fuel ratio repeated control. The routine is entered at step 120. Then, at step 122, a decision is made as to whether or not the lean and rich repeated control flag LRFLAG is set at "1". If LRFLAG is not at "1", the current condition is not in a condition where the lean and rich repeated control for recovery of the NOx absorbent is to be conducted, and therefore the routine proceeds to step 138 and returns.

If LRFLAG is set at "1" at step 122, the routine proceeds to step 124. Then, a flag control is conducted so that the engine is operated at lean air-fuel ratios for a first predetermined time period and then at rich air-fuel ratios for a second predetermined time period and the lean and rich operations are repeated. More particularly, at step 124, a decision is made as to whether or not lean flag is set at "1" (this means, rich flag is set at "0"). If lean flag is set at "1", the routine proceeds to step 126 where the lean operation time period is counted by, for example, adding a time interval of entering the routine (delta t) to the counted lean operation period (SLP) of the previous cycle. Then, at step 128, a decision is made as to whether or not the accumulated lean operation period (SLP) exceeds a first predetermined period (for example, two minutes). If SLP does not exceed the first period, the current engine operating condition is a condition where the lean operation is to be maintained, and the routine proceeds to step 138 where the cycle ends. If SLP exceeds the first period, the routine proceeds to step 130 where rich flag is set to "1" (this means that lean flag is set to "0"), and then the routine proceeds to step 138 and returns. By this procedure, lean flag is set at "1" (rich flag is set at "1") for the first period.

If lean flag is not set at "1" (rich flag is not set at "0"), the routine proceeds to step 132 where the rich operation time period (SRP) is counted by, for example, adding the interval (delta t) to the counted rich operation period of the previous cycle. Then, at step 134, a decision is made as to whether or not the accumulated rich operation period (SRP) exceeds a second predetermined time period (for example, 3 seconds). If SRP does not exceeds the second period, the rich operation should be maintained, and therefore the routine proceeds to step 138 where the cycle ends. If SRP exceeds the second period, the routine proceeds to step 136, where lean flag is set to "1" (this means that rich flag is set to "0"), and then the routine proceeds to step 138 and returns. By this procedure, rich flag is set at "1" (lean flag is set at "0") for the second period.

Then, the routine of FIG. 7 is entered at step 140. Then, at step 142, a decision is made as to whether or not the lean and rich repeated control flag LRFLAG is set at "1", that is, whether or not the current condition is in a condition where the recovering control of the SOx-poisoned NOx absorbent should be conducted. If flag LRFLAG is set at "1" at step 142, the routine proceeds to step 144 where a decision is made as to whether or not rich flag is set at "1" (this means that lean flag is set at "0"). If rich flag is "1", the routine proceeds to step 146 where a rich air-fuel ratio operation is conducted, and then proceeds to step 150 where the cycle ends. The rich air-fuel ratio control at step 146 is executed by setting a rich control flag RCON (see FIG. 8) at "1". If LRFLAG is not "1" and if rich flag is not "1", the routine proceeds to step 148, where flag RCON is set at "0" and then proceeds to step 150 where the cycle ends.

Figure 8:
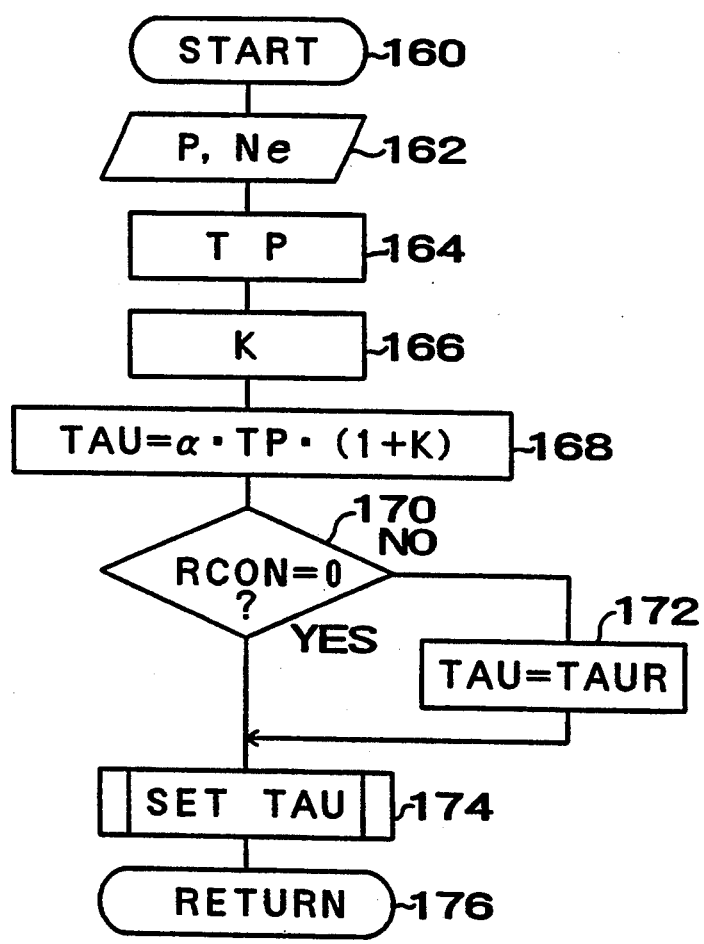
FIG. 8 is a flow chart of a schematic fuel injection control routine in accordance with the first embodiment of the invention.

FIG. 8 illustrates a fuel injection control routine which is entered after the routine of FIG. 7, which includes added steps 170 and 172. More particularly, the routine is entered at step 160. Then, at step 162, the current engine load P and the current engine speed Ne are entered. Then, at step 164, a basic fuel injection amount TP is determined based on the entered P and Ne. At step 166, various modification factors are determined. Then, at step 168, fuel injection time period TAU is determined from the following equation:

$$TAU = alpha*TP*(1+K)$$

Then, the routine proceeds to step 170 where a decision is made as to whether flag RCON determined at steps 146 and 148 of FIG. 7 is "0" or not. If RCON is "0", the fuel injection control is normal and therefore the routine proceeds to step 174, where TAU is set and fuel injection is conducted for the period of TAU. Then, the routine proceeds to step 176 where the cycle ends. If flag RCON is "1" at step 170, the routine proceeds to step 172 where TAU is changed to TAUR (a fuel injection period for making the air-fuel ratio rich) despite the calculation at step 168. Then, the routine proceeds to step 174, where TAU of TAUR is set. Then, the routine proceeds to step 176 where the cycle ends. In this way, the rich air-fuel control of step 146 of FIG. 7 is conducted.

Operation of the first embodiment of the invention will now be explained. NOx included in exhaust gas is absorbed by the NOx absorbent 6, so that the amount of NOx exhausted to the atmosphere is suppressed. However, the NOx absorption ability of the NOx absorbent 6 may gradually decrease due to SOx-poisoning when it is used for a long time period. For the purpose of recovering the SOx-poisoned NOx absorbent, the exhaust gas condition of excess oxygen and high temperature (for example, higher than 550° C.) is detected.

In such an exhaust gas condition, recovery of the NOx absorbent 6 is possible. So, the lean and rich air-fuel ratio repeated control is executed wherein a lean air-fuel ratio operation is conducted for a first period (for example, two minutes) and then a rich air-fuel ratio operation is conducted for a second period (for example, three seconds). In the rich air-fuel ratio operation, the NOx absorbent is recovered according to the mechanism shown in the right half portion of FIG. 4.

The reason why recovery of the NOx absorbent is conducted at temperatures higher than the predetermined temperature (550° C. in exhaust gas temperature and 500° C. in NOx absorbent temperature) is that absorption of NOx is promoted more than generation of sulfate due to SOx so that the NOx absorbent is little SOx-poisoned at that temperature range.

The reason why the rich air-fuel ratio operation is introduced before a relatively long period has elapsed is to recover the NOx absorbent before the SOx-poisoning proceeds to the interior of the NOx absorbent, that is, while only the surface portion of the NOx absorbent is SOx-poisoned, so that recovery is easy. If sulfate ions diffuse to the interior of the absorbent to form sulfate and the state is maintained for a long period of time, recovery of the NOx absorbent from the SOx-degradation is difficult.

Figure 9:
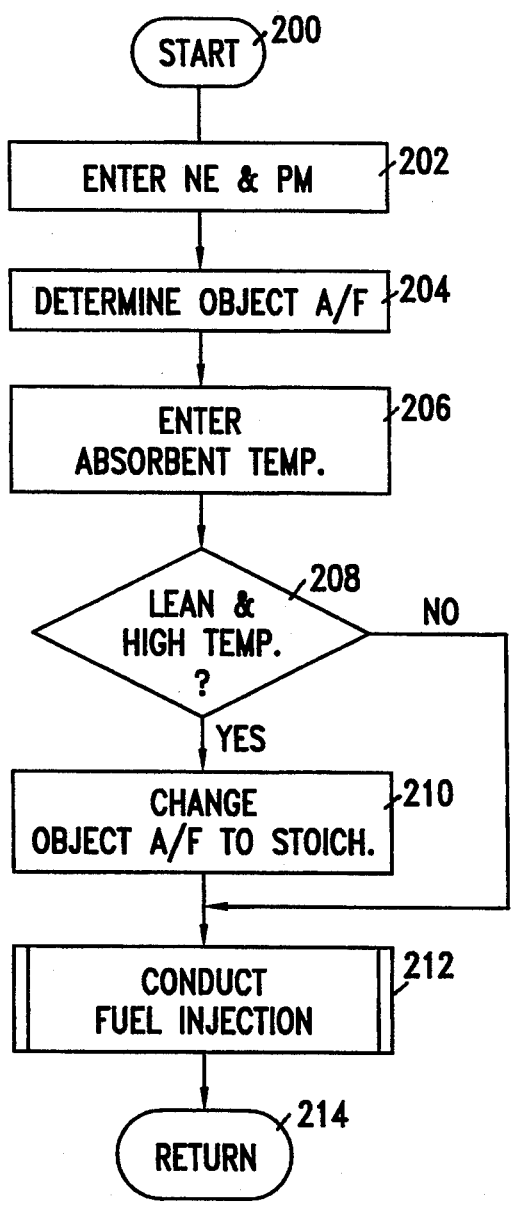
FIG. 9 is a control flow chart of an exhaust gas purification apparatus in accordance with a second embodiment of the invention.

FIG. 9 illustrates the second embodiment of the invention wherein the oxygen concentration of exhaust gas is maintained at a decreased state continuously for a certain period of time when it is detected that the exhaust gas is in an excess oxygen condition and the exhaust gas or NOx absorbent temperature is high (higher than 550° C. in exhaust gas temperature and 550° C. in NOx absorbent temperature). By the decrease in the excess oxygen, the NOx absorbent is unlikely to be SOx-poisoned and is recovered from an SOx-poisoned state even if it is poisoned.

More particularly, the routine of FIG. 9 is entered at step 200. Then, at step 202, the current engine operating conditions including an engine speed and an engine load are entered. At step 204, a current objective air-fuel ratio is determined based on the entered engine operating conditions. In a conventional air-fuel ratio control, the routine proceeds from step 204 to step 212 where fuel injection is conducted. However, in the second embodiment of the invention, steps 206, 208 and 210 are added. More particularly, the routine proceeds from step 204 to step 206 where the current NOx absorbent temperature (or exhaust gas temperature) is entered. Then, at step 208, a decision is made as to whether the oxygen concentration of the exhaust gas is high and the NOx absorbent temperature is high (for example, higher than 500° C.). Step 208 constitutes an operating condition determining means of the second embodiment of the invention. If the exhaust gas is in an excess oxygen condition and the NOx absorbent temperature is high, the routine proceeds to step 210 where the objective air-fuel ratio is changed from the ratio determined at step 204 to a stoichiometric air-fuel ratio. By this procedure, the oxygen concentration of exhaust gas is decreased continuously for a certain time period so that the NOx absorbent is unlikely to be SOx-poisoned. Step 210 constitutes an exhaust gas oxygen concentration continuously decreasing means of the second embodiment of the invention.

Figure 10:
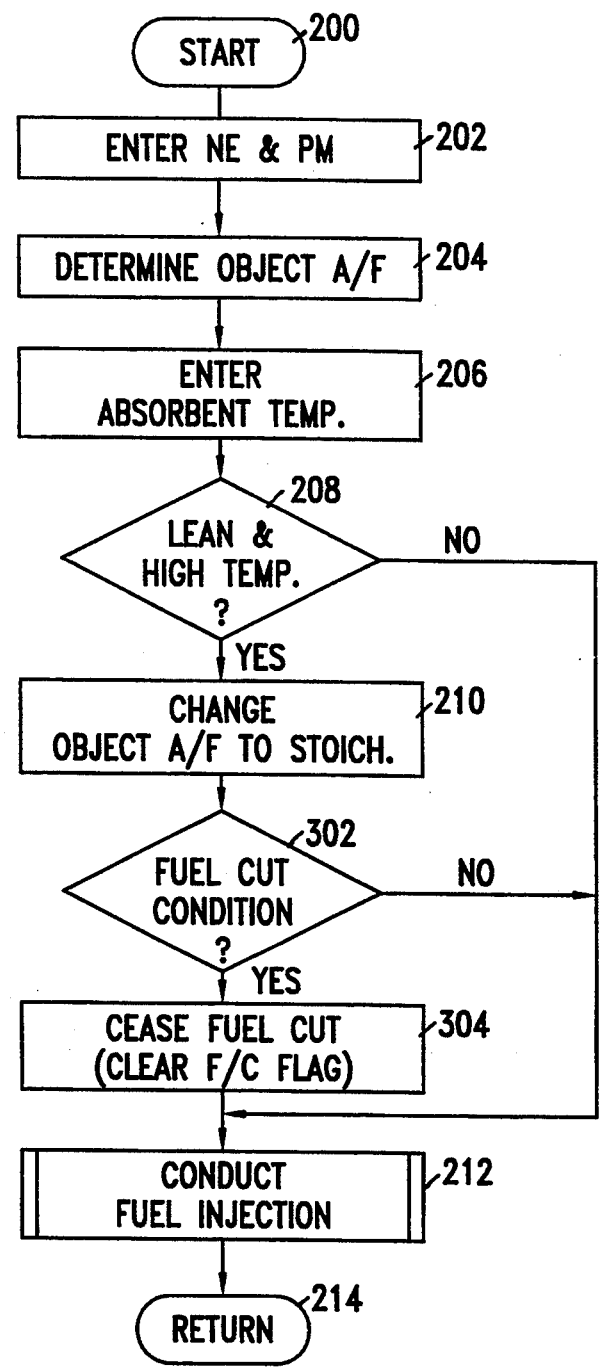
FIG. 10 is a control flow chart of an exhaust gas purification apparatus in accordance with a third embodiment of the invention.

FIG. 10 illustrates the third embodiment of the invention.

In a conventional air-fuel ratio control, fuel cutting is conducted in a deceleration time so as to improve fuel efficiency. However, if fuel cutting of deceleration is conducted in a high temperature condition higher than 550° C. in exhaust gas temperature or higher than 500° C. in NOx absorbent temperature, SOx-poisoning of the NOx absorbent 6 is promoted in the fuel cut, excess oxygen gas condition. For the purpose of preventing the SOx-poisoning, in the third embodiment of the invention, fuel cutting of deceleration is ceased in such a high temperature condition. For ceasing fuel cutting in the high temperature condition, as illustrated in FIG. 10, steps 302 and 304 are added to the routine of FIG. 9.

At step 302, a decision is made as to whether or not the current engine operating condition is in a condition where fuel cutting is to be conducted, for example whether or not the engine operating condition is in deceleration. If the engine operating condition is not in a condition where fuel cutting is to be conducted, the routine proceeds to step 212, and if the engine operating condition is in a condition where fuel cutting is to be conducted, the routine proceeds to step 304 where the fuel cutting is ceased and fuel cut flag is cleared. Then, the routine proceeds to step 212. By this procedure, in the condition that fuel cutting is to be conducted and the NOx absorbent temperature is high, fuel cutting is ceased so that SOx-poisoning of the NOx absorbent is suppressed. Other structures and operation of the third embodiment of the invention are the same as those of the second embodiment of the invention. Steps 302 and 304 constitutes a fuel-cutting ceasing means of the third embodiment of the invention.

Figure 11:
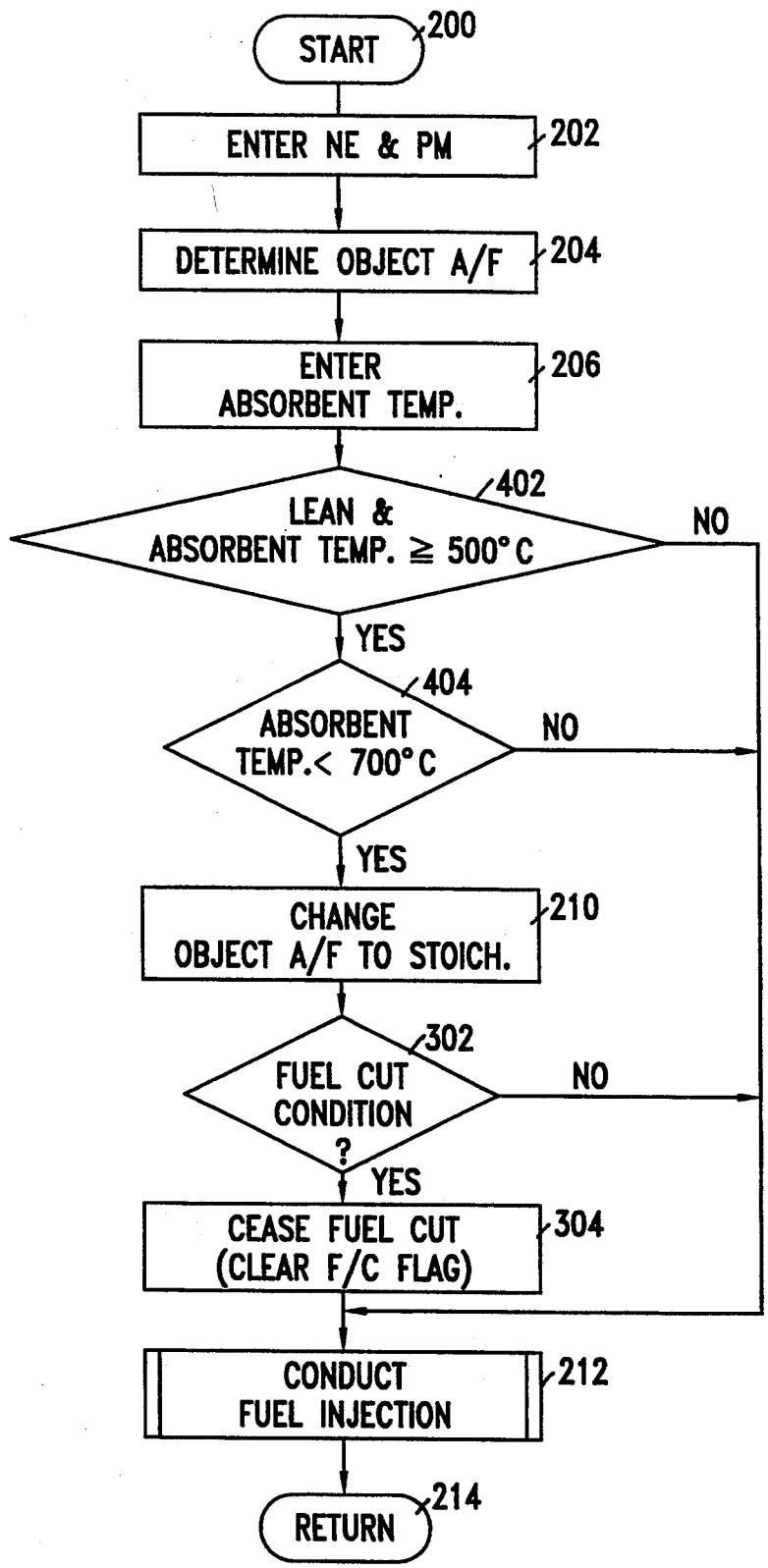
FIG. 11 is a control flow chart of an exhaust gas purification apparatus in accordance with a fourth embodiment of the invention.

FIG. 11 illustrates the fourth embodiment of the invention. It has been found in tests for developing the invention that the NOx absorbent is SOx-poisoned only in a certain high temperature range, more particularly, in an exhaust gas temperature range of about 550° C.-750° C. (in an NOx absorbent temperature range of about 500° C.-700° C.). Degradation of the NOx absorbent due to SOx is not promoted at NOx absorbent temperatures higher than 700° C. Thus, in the fourth embodiment of the invention, the exhaust gas oxygen concentration control means decreases the oxygen concentration only when it is found that the current exhaust gas temperature (or NOx absorbent temperature) is within the above-described temperature range so that the fuel economy of the engine is improved.

For the purpose of conducting the control, as illustrated in FIG. 11, steps 402 and 404 are added to the control routine of the third embodiment of the invention (the routine of FIG. 10). At steps 402 and 404, a decision is made as to whether or not the current exhaust gas temperature is within the range of 500° C.-700° C. (or the NOx absorbent temperature is within the range of 550° C.-750° C.). Only when the temperature is within the range, the routine proceeds to step 210 where the oxygen concentration is decreased. In this instance, steps 402 and 404 constitute an operating condition determining means of the fourth embodiment of the invention. Other structures and operation of the fourth embodiment of the invention are the same as those of the third embodiment of the invention.

Figure 12:
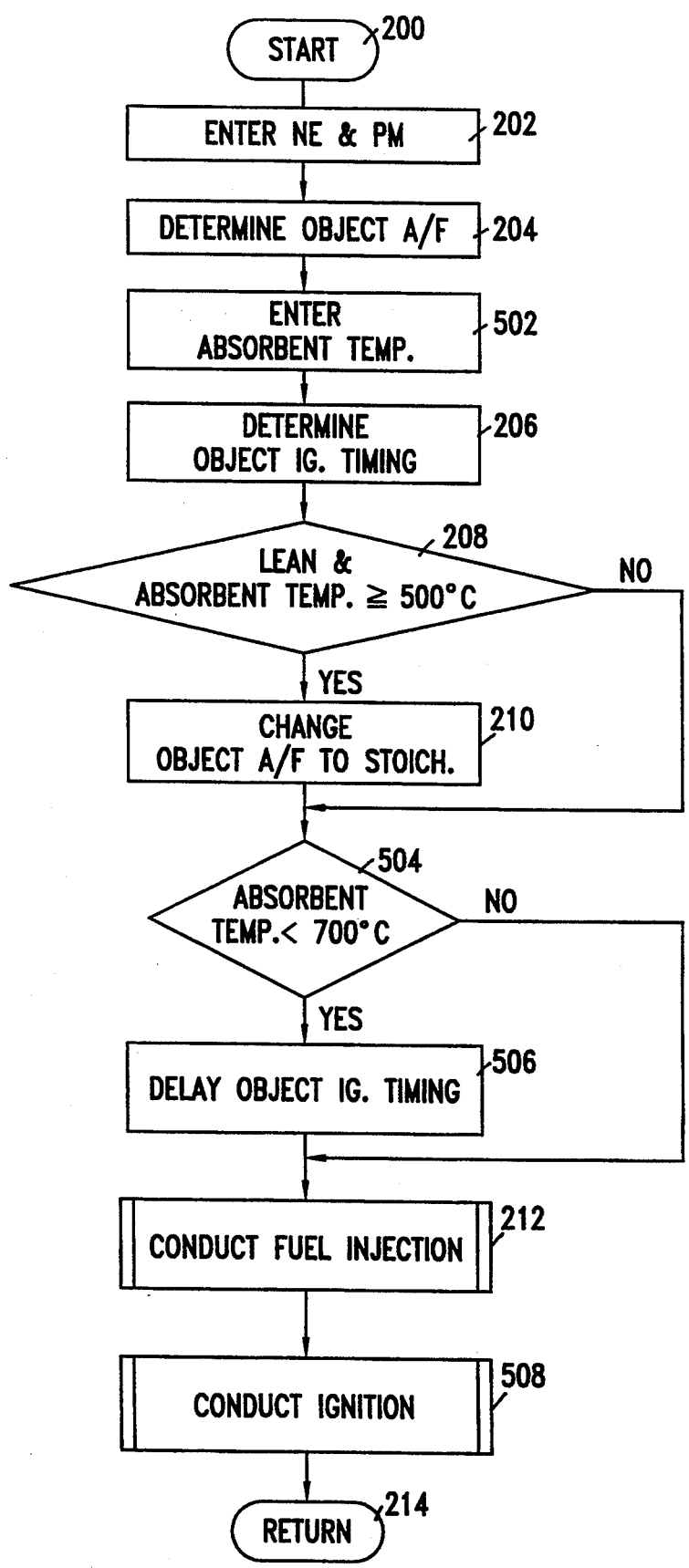
FIG. 12 is a control flow chart of an exhaust gas purification apparatus in accordance with a fifth embodiment of the invention.

FIG. 12 illustrates the fifth embodiment of the invention. As discussed above, degradation of the NOx absorbent due to SOx in an excess oxygen gas condition is promoted only when the exhaust gas or NOx absorbent temperature is within a certain temperature range. Thus, when it is found that the NOx absorbent temperature is in the temperature range, the NOx absorbent temperature is increased to a temperature above that temperature range so that SOx-poisoning of the NOx absorbent is not promoted. In the fifth embodiment of the invention, when it is found that the exhaust gas or NOx absorbent temperature is in the temperature range, the ignition timing of the engine is delayed so that the exhaust gas or NOx absorbent temperature is increased to a temperature above the temperature range.

More particularly, in FIG. 12 which includes steps 502, 504, 506 and 508 added to the routine of FIG. 9, the routine proceeds from step 204 to step 502 where the current objective ignition timing is determined based on the current engine operating condition. From steps 208 and 210, the routine proceeds to 504 where it is determined whether or not the NOx absorbent temperature is lower than 700° C. If the NOx absorbent temperature is not lower than 700° C., the routine proceeds to step 212. If the NOx absorbent temperature is lower than 700° C., the routine proceeds to step 506 where the objective ignition timing is delayed and then the routine proceeds to step 212. From step 212, the routine proceeds to step 508 where ignition in accordance with the objective ignition timing is conducted. Then, the routine proceeds to step 214. In this instance, steps 208 and 504 constitute an operating condition determining means of the fifth embodiment of the invention which determines whether or not the current NOx absorbent or exhaust gas temperature is high and within the predetermined temperature range. Steps 210, 506 and 508 constitute an exhaust gas oxygen concentration control means of the fifth embodiment of the invention which increases the NOx absorbent temperature to a temperature above the predetermined temperature range when it is found that the NOx absorbent temperature is in the temperature range.

Figure 13:
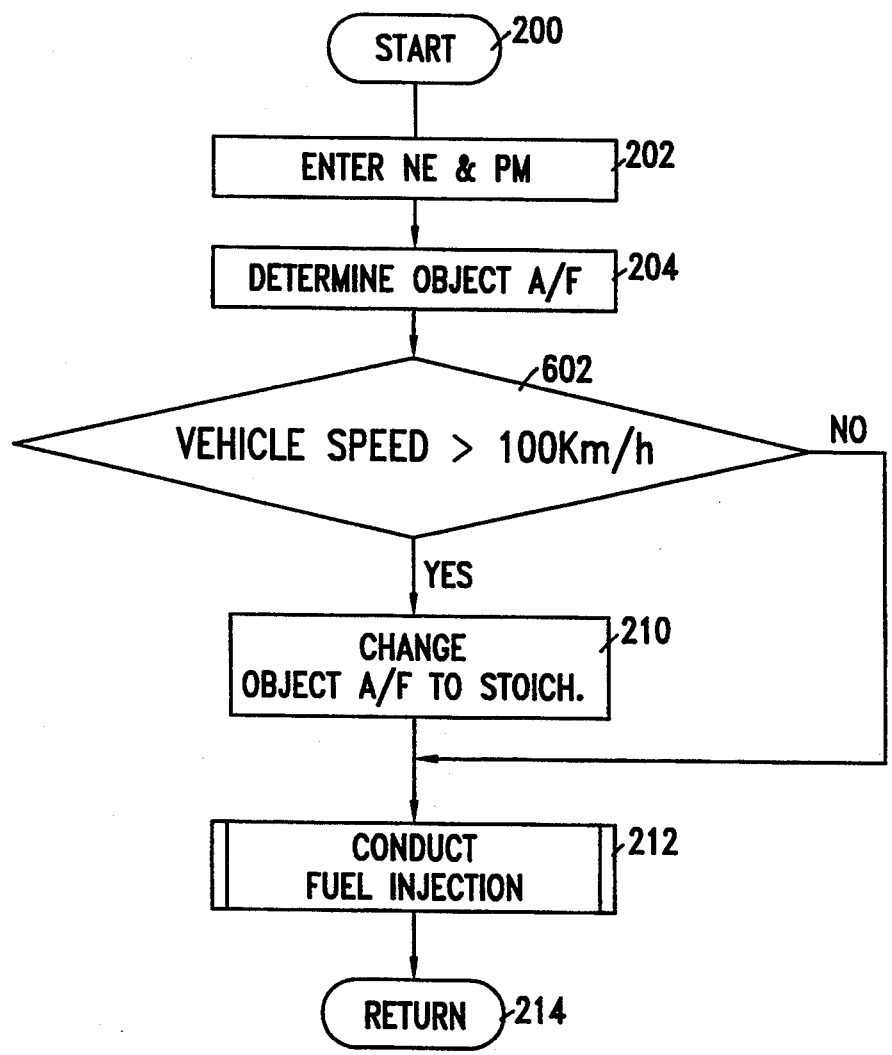
FIG. 13 is a control flow chart of an exhaust gas purification apparatus in accordance with a sixth embodiment of the invention.

FIG. 13 illustrates the sixth embodiment of the invention. In the first through fifth embodiments of the invention, there is a need to provide a temperature sensor to detect the exhaust gas or NOx absorbent temperature, or there is a need to presume the exhaust gas or NOx absorbent temperature based on the engine speed and engine load. Provision of the temperature sensor is accompanied by an increase in cost of the apparatus. The sixth embodiment of the invention aims to presume the exhaust gas or NOx absorbent temperature based on a vehicle speed without installing a temperature sensor. Therefore, an operating condition detecting means of the sixth embodiment includes a vehicle speed sensor 18 (see FIGS. 1 and 2). In this instance, the higher the vehicle speed, the higher the exhaust gas or NOx absorbent temperature is. The vehicle speed corresponding to the exhaust gas temperature 550° C. is about 100 Km/h.

More particularly, in FIG. 13, the routine proceeds to from step 204 to step 602 where a decision is made as to whether or not the current vehicle speed exceeds the predetermined vehicle speed (for example, 100 Km/h). If the current vehicle speed exceeds the predetermined vehicle speed, the exhaust gas temperature is presumed to be high, and the routine proceeds to step 210. At step 210, the objective air-fuel ratio is changed to a stoichiometric air-fuel ratio, and then the routine proceeds to step 212. If the predetermined vehicle speed does not exceed the predetermined vehicle speed at step 602, the routine proceeds directly to step 212. Step 602 constitutes an operating condition determining means of the sixth embodiment of the invention. Other structures and operation of the sixth embodiment of the invention are the same as those of the second embodiment of the invention.

Figure 14:
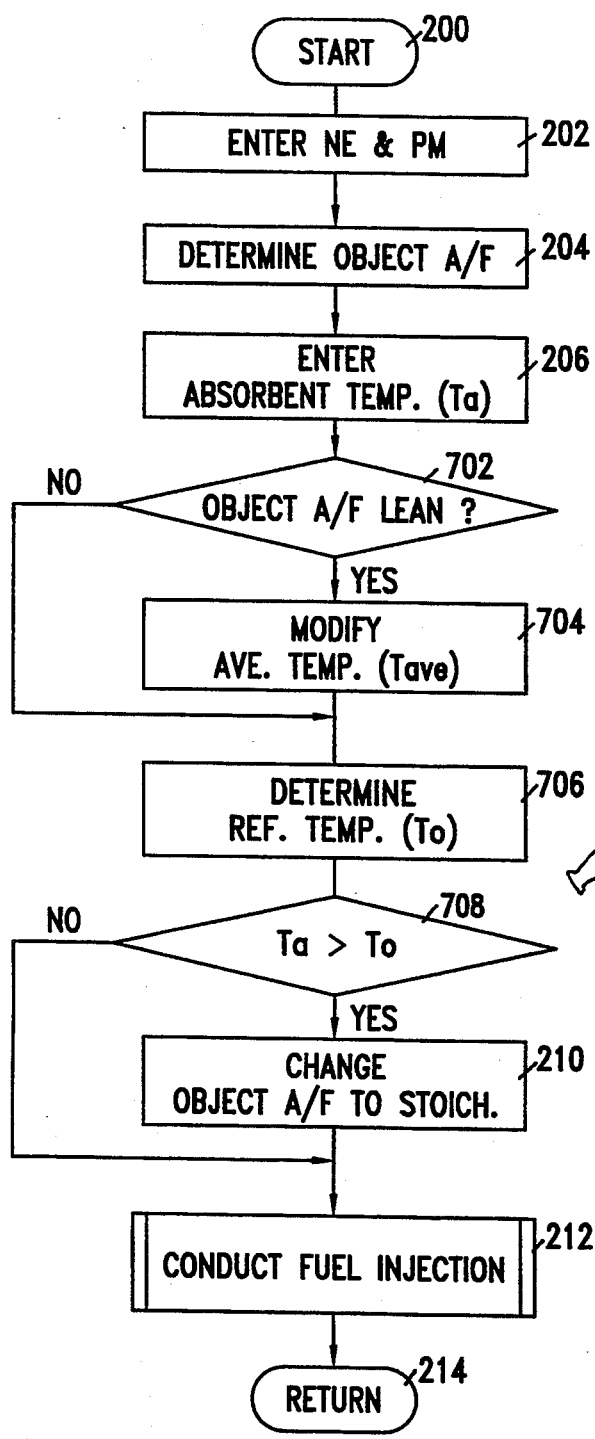
FIG. 14 is a control flow chart of an exhaust gas purification apparatus in accordance with a seventh embodiment of the invention.
Figure 14:
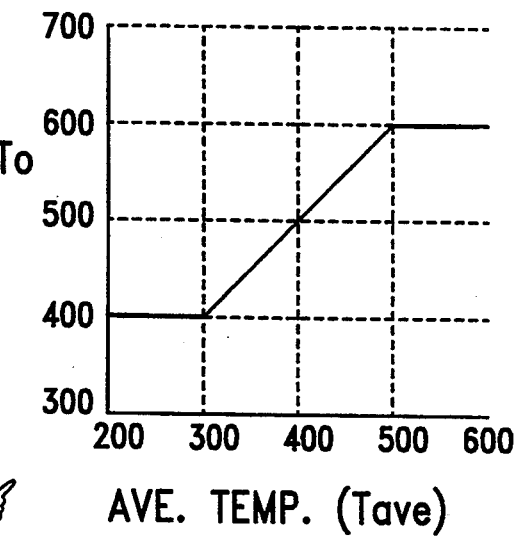

FIG. 14 illustrates the seventh embodiment of the invention. When a low engine speed and low engine load operation continues for a long time period such as when a vehicle is running on a town street, the NOx absorbent temperature continues to be low and does not reach the switching temperature (550° C. in exhaust gas temperature and 500° C. in NOx absorbent temperature) at which the air-fuel ratio is to be switched from the lean air-ratio to a rich air-ratio. As a result, SOx-poisoning of the NOx absorbent will be gradually promoted.

In this instance, even at low temperatures, the NOx absorbent is poisoned though the poisoning is very slow. It was found in tests conducted in developing the present invention that when the NOx absorbent is poisoned by SOx at certain temperatures in an excess oxygen exhaust gas condition, the sulfur component ($SO_2$) will be released from the NOx absorbent if the SOx-poisoned NOx absorbent is heated at a temperature a little higher than the temperature at which the NOx absorbent has been SOx-poisoned, and the NOx absorbent will be recovered. In case where the NOx absorbent is poisoned by SOx at relatively low temperatures, the reference temperature for determining whether or not the air-fuel ratio is to be switched to a rich air-fuel ratio can be set at a low temperature. In contrast, when a high temperature (for example, 500° C. in NOx absorbent temperature) and lean air-fuel ratio operation continues for a relatively long time, the NOx absorbent temperature should be increased to a temperature (for example, 600° C.) higher than the high temperature to recover the NOx absorbent, and thus the reference temperature for determining whether the air-fuel ratio is to be switched to a rich ratio should be set at a high temperature. In the seventh embodiment of the invention, to make an appropriate switching, the reference temperature for determining the switching timing is changed in accordance with the history of the temperatures that the NOx absorbent has experienced at lean air-fuel ratio operation.

More particularly, as illustrated in FIG. 14, step 208 of FIG. 9 is replaced by steps 702–708 in FIG. 14. The routine proceeds from step 206 to step 702 where a decision is made as to whether or not the current objective air-fuel ratio is lean. If the current operation is not a lean air-fuel ratio operation, the routine proceeds to step 706, and if the current operation is a lean air-fuel ratio operation, the routine proceeds to step 704 where an average absorbent temperature at the lean air-fuel operation is calculated. For example, if the average absorbent temperature of the past ten seconds is 400° C. and the current absorbent temperature of one second is 450° C., the average absorbent temperature is 404° C., calculated from equation: $(400 \times 10 + 450 \times 1)/11 = 404$. Then, at step 706, a reference temperature $T_0$ for determining whether the engine operation is to be switched from a lean air-fuel ratio operation to a rich air-fuel ratio operation is obtained in accordance with the average temperature Tave based on a map shown in FIG. 14. In the map, the relationship between $T_0$ and Tave is predetermined such that in the vicinity of 500°, the higher Tave, the higher $T_0$ is. Then, the routine proceeds to step 708 where a decision is made as to whether or not the current NOx absorbent temperature Ta is higher than the reference temperature $T_0$. If Ta is not higher than $T_0$, the routine proceeds to step 212, and if Ta is higher than $T_0$, the condition is deemed to be in a lean air-fuel ratio condition and the routine proceeds to step 210 where the air-fuel ratio is changed from a lean air-fuel ratio to a rich air-fuel ratio so that the oxygen concentration of the exhaust gas is decreased. Other structures and operation of the seventh embodiment of the invention are the same as those of the second embodiment of the invention.

Figure 15:
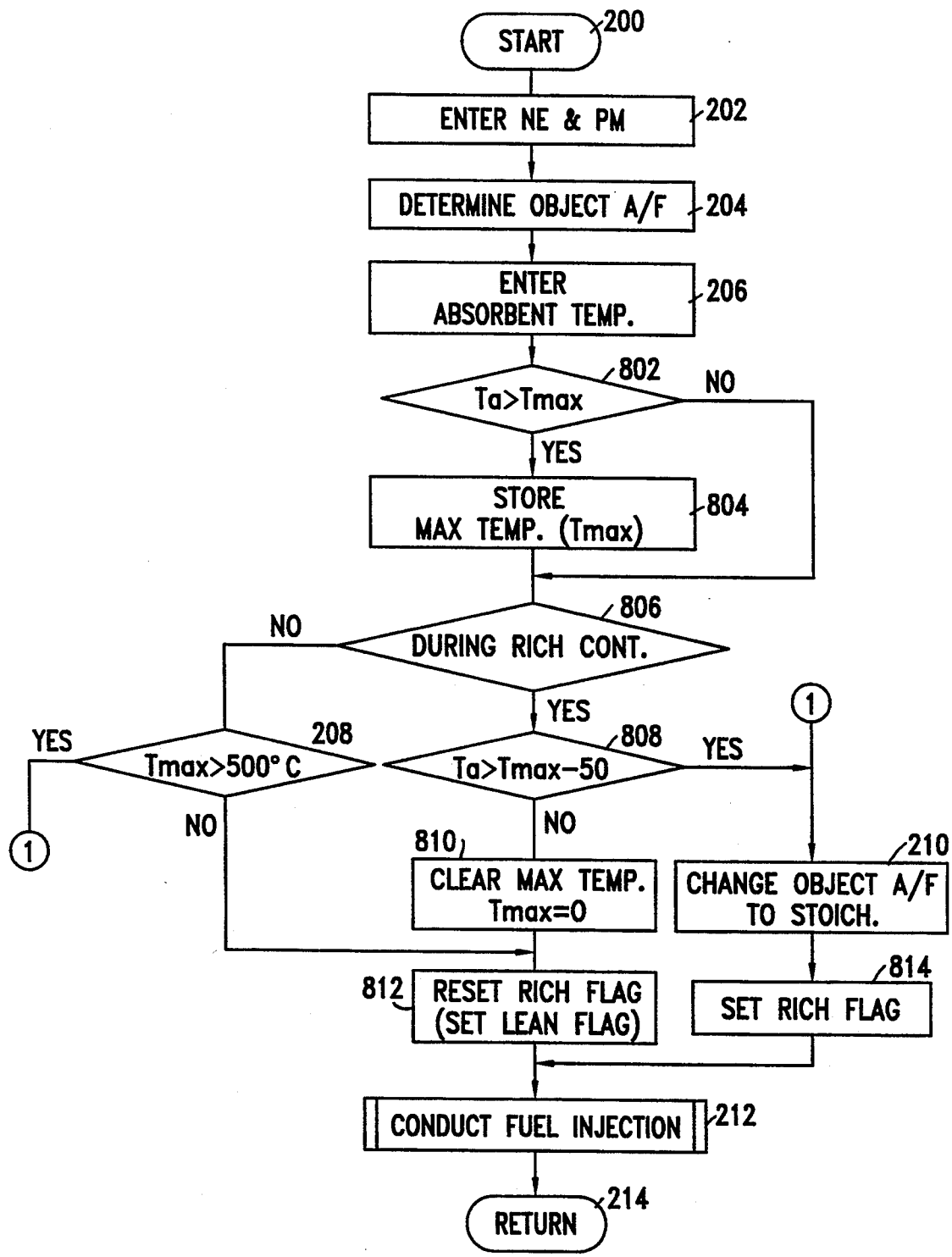
FIG. 15 is a control flow chart of an exhaust gas purification apparatus in accordance with an eighth embodiment of the invention.

FIG. 15 illustrates the eighth embodiment of the invention. The condition where recovery of the SOx-poisoned NOx absorbent is conducted should be limited to the condition where the exhaust gas includes excess oxygen and where the exhaust gas or NOx absorbent temperature is high, for improving the fuel economy. Since the NOx absorbent has a large heat capacity, when the NOx absorbent temperature rises above 500° C., the NOx absorbent temperature will not immediately decrease in response to a decrease in the exhaust gas temperature though the exhaust gas temperature decreases to a temperature lower than 500° C. As a result, switching from the stoichiometric or rich air-fuel ratio to a lean air-fuel ratio is delayed, and fuel economy decreases. To prevent this delay in switching the air-fuel ratio, in the eighth embodiment of the invention, a switching temperature from a stoichiometric or rich air-fuel ratio to a lean air-fuel ratio is set lower than a switching temperature from a lean air-fuel ratio to a stoichiometric or rich air-fuel ratio, for example set lower by 50° C. than a maximum NOx absorbent temperature, so that the engine operation can easily return to a lean air-fuel ratio operation.

More particularly, as illustrated in FIG. 15, steps 802–814 are added to the routine of FIG. 9. The routine proceeds from step 206 to step 802 and then to 804 so that a maximum NOx absorbent temperature Tmax is stored. Then, the routine proceeds to step 806 where a decision is made as to whether the engine is in a rich air-fuel ratio operation referring to rich control flag. If the engine is in a lean air-fuel ratio operation, the routine proceeds to step 208 where a decision is made whether or not the maximum temperature Tmax which the NOx absorbent has experienced exceeds a switching temperature (for example, 500° C.). If Tmax exceeds the switching temperature, the routine proceeds to step 210 where the air-fuel ratio is changed from the lean ratio to a stoichiometric or rich ratio, and then the routine proceeds to step 814. At step 814, the rich control flag is set and then the routine proceeds to step 212. If Tmax is equal to or lower than 500° C. at step 208, it is deemed that the lean air-fuel operation may be continued, and the routine proceeds to step 812. At step 812, the rich control flag is reset (lean control flag is set), and the routine proceeds to step 212.

At the next cycle, after passing through step 814, the routine proceeds from step 806 to 808 so that the stoichiometric or rich air-fuel ratio operation is continued. When the exhaust gas temperature decreases, the NOx absorbent temperature Ta decreases. If it is determined at step 808 that Ta has decreased to a temperature lower than the temperature of Tmax−50° C., the routine proceeds from step 808 to step 810 where Tmax is cleared to zero, and the routine proceeds to step 812. At step 812, the rich control flag is reset, and then at step 212 the lean air-fuel ratio operation is continued. If Ta is equal to or higher than the temperature of Tmax−50° C., the stoichiometric or rich air-fuel operation is continued. By this control, the reference temperature for switching the engine operation from the stoichiometric or rich air-fuel ratio operation to a lean air-fuel ratio operation can be set lower than the reference temperature for switching the engine operation from the lean air-fuel ratio operation to a stoichimetric or rich air-fuel ratio operation, so that the engine operation can be smoothly returned to a lean air-fuel ratio operation. Other structures and operation of the eighth embodiment of the invention are the same as those of the second embodiment of the invention.

Figure 16:
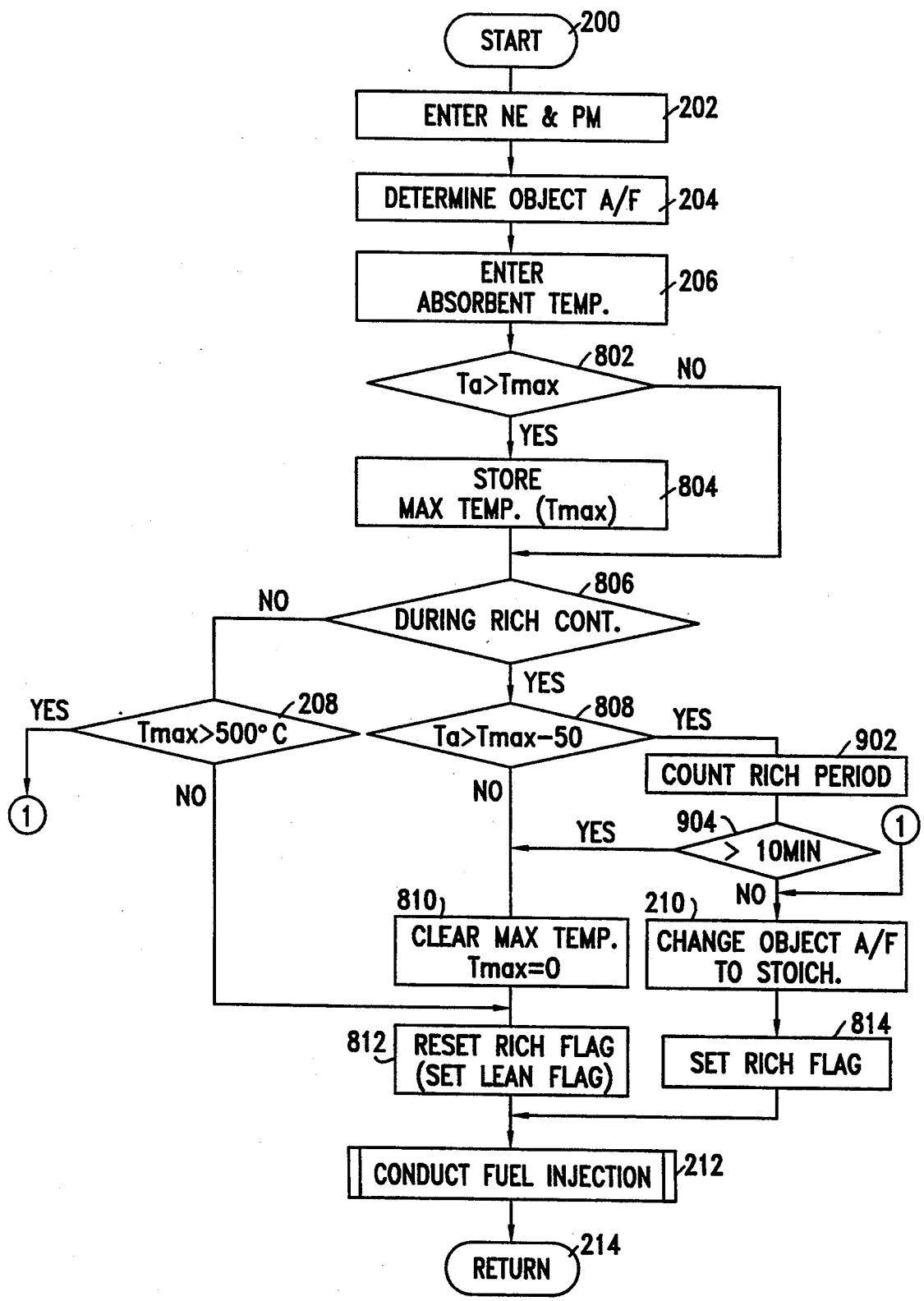
FIG. 16 is a control flow chart of an exhaust gas purification apparatus in accordance with a ninth embodiment of the invention.

FIG. 16 illustrates the ninth embodiment of the invention. In the ninth embodiment, means (steps 902 and 904) are added to the routine of the eighth embodiment, for returning the rich air-fuel operation to a lean air-fuel ratio operation independently of the NOx absorbent temperature if the rich air-fuel ratio operation continues for a predetermined time period (for example, ten minutes) so that the operation is sure to return to the lean air-fuel ratio operation.

More particularly, if it is determined at step 808 that Ta is higher than Tmax−50° C. and the rich air-fuel ratio operation is to be continued, the routine proceeds to step 902 where the rich air-fuel operation period is counted. Then, the routine proceeds to step 904 where a decision is made as to whether the counted period exceeds a predetermined period, for example 10 minutes. If the counted period exceeds the predetermined period, the routine proceeds to step 810 and then step 812 where the operation is switched to a lean air-fuel ratio operation. If the counted period does not exceed the predetermined period, it is deemed that the rich air-fuel ratio may be continued, and the routine proceeds to step 210. Other structures and operation of the ninth embodiment of the invention are the same as those of the eighth embodiment of the invention.

Figure 17:
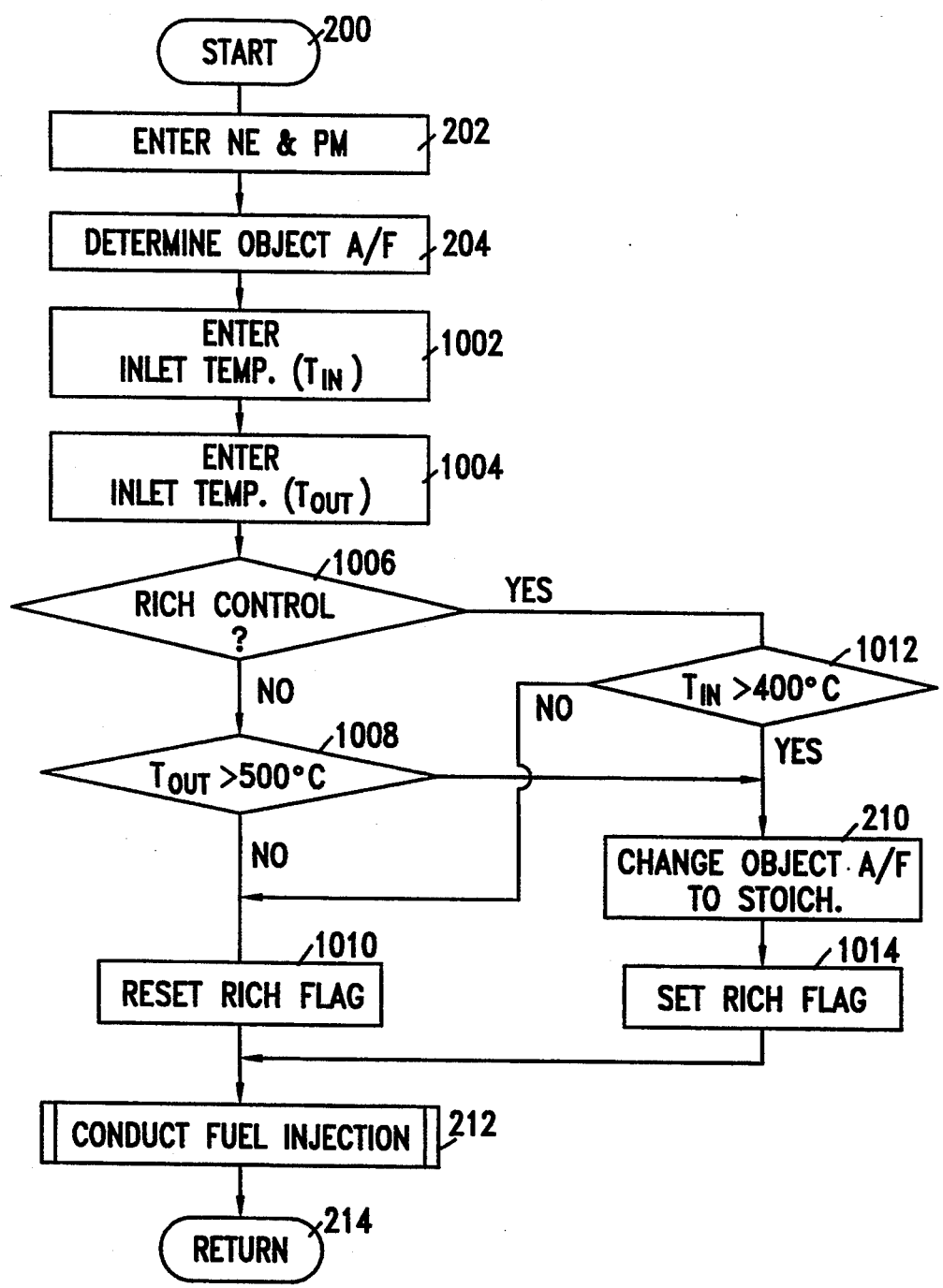
FIG. 17 is a control flow chart of an exhaust gas purification apparatus in accordance with a tenth embodiment of the invention.

FIG. 17 illustrates the tenth embodiment of the invention. As discussed above, since the heat capacity of the NOx absorbent is large, if the oxygen concentration control is conducted based on the NOx absorbent temperature, switching from the rich air-fuel ratio to a lean air-fuel ratio is delayed. This delay will be accompanied by a decrease in fuel economy. Contrarily, since the NOx absorbent inlet temperature alters largely, if the oxygen concentration control is conducted based on the NOx absorbent inlet temperature, the air-fuel ratio may be switched from the lean air-fuel ratio to a rich air-fuel ratio too early. That is also accompanied by a decrease in fuel economy. In order to prevent this, in the tenth embodiment, switching from a lean air-fuel ratio to a stoichiometric or rich air-fuel ratio is conducted based on an NOx absorbent outlet gas temperature and switching from a stoichiometric or rich air-fuel ratio to a lean air-fuel ratio is conducted based on an NOx absorbent inlet gas temperature. Thus, an operating condition detecting means of the tenth embodiment of the invention includes both the inlet gas temperature 10 and an outlet gas temperature 10A (see FIGS. 1 and 2).

More particularly, as illustrated in FIG. 17, steps 1002–1014 are added to the routine of the second embodiment (FIG. 9). The routine proceeds from step 204 to step 1002 and then to step 1004 where the current inlet gas temperature Tin and outlet gas temperature Tout of the NOx absorbent are entered. Then, at step 1006, a decision is made referring to the rich control flag as to whether or not the engine is in a stoichiometric or rich air-fuel ratio operation. If the engine is not in a stoichiometric or rich air-fuel ratio operation, the routine proceeds to step 1008 where a decision is made as to whether or not the current NOx absorbent outlet temperature Tout exceeds a predetermined temperature (for example, 500° C.). If Tout exceeds the predetermined temperature, the routine proceeds to step 210 where the engine operation is changed to a stoichiometric operation. Then, the routine proceeds to step 1014 where the rich control flag is set. Then, the routine proceeds to step 212. If Tout is equal to or lower than 500° C. at step 1008, it is deemed that the lean air-fuel operation may be continued, and the routine proceeds to step 1010 where the rich control flag is reset. Then, the routine proceeds to step 212. If the engine is in a rich air-fuel operation at step 1006, the routine proceeds to step 1012 where a decision is made as to whether the NOx absorbent inlet temperature Tin exceeds a predetermined temperature (for example, 400° C.). If Tin is lower than the predetermined temperature, it is deemed that the lean air-fuel ratio operation may be continued, and the routine proceeds to step 1010. If Tin is higher than the predetermined temperature at step 1012, the routine proceeds to step 210 and the stoichiometric or rich air-fuel operation is continued. Other structures and operation of the tenth embodiment of the invention are the same as those of the second embodiment of the invention.

In accordance with the present invention, since the oxygen concentration of exhaust gas is decreased when the exhaust gas is in an excess oxygen condition and the exhaust gas or NOx absorbent temperature is high, the sulfate absorbed in the NOx absorbent is reduced to $SO_2$ which is easily released from the NOx absorbent so that the SOx-poisoned NOx absorbent is recovered and the durability of the exhaust gas purification apparatus is improved.

Although ten embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. An exhaust gas purification apparatus for an internal combustion engine comprising:
   an internal combustion engine capable of fuel combustion at lean air-fuel ratios and an exhaust conduit connected to the engine;
   an NOx absorbent installed in the exhaust conduit and including at least one element selected from the group consisting of alkaline earth, rare-earth, alkaline metals, and oxides of alkaline earth, rare-earth, and alkaline metals, the NOx absorbent absorbing NOx included in exhaust gas having excess oxygen therein and releasing the NOx which the NOx absorbent has absorbed when an oxygen concentration of the exhaust gas decreases;
   operating condition detecting means for detecting an operating condition of the engine;
   operating condition determining means for determining whether the exhaust gas includes excess oxygen and for determining whether one of an exhaust gas temperature and an NOx absorbent temperature is high; and
   exhaust gas oxygen concentration control means for decreasing the oxygen concentration of the exhaust gas flowing into the NOx absorbent when the operating condition determining means determines that the exhaust gas includes excess oxygen and that one of an exhaust gas temperature and an NOx absorbent temperature is high.

2. An apparatus according to claim 1, further comprising a three-way catalyst installed in the exhaust conduit downstream of the NOx absorbent.

3. An apparatus according to claim 1, wherein the NOx absorbent comprises a Ba-Cu-O base absorbent.

4. An apparatus according to claim 1, wherein the operating condition detecting means includes an engine speed sensor and an engine load sensor.

5. An apparatus according to claim 1, wherein the operating condition determining means determines that the exhaust gas or NOx absorbent temperature is high when the exhaust gas temperature is higher than 550° C. or the NOx absorbent temperature is higher than 500° C.

6. An apparatus according to claim 1, wherein the exhaust gas oxygen concentration control means includes means for repeatedly decreasing the exhaust gas oxygen concentration by controlling fuel injection so that the oxygen concentration of the exhaust gas is repeatedly decreased.

7. An apparatus according to claim 6, wherein the means for repeatedly decreasing the exhaust gas oxygen concentration includes means for controlling the fuel injection so that a sequence of a lean air-fuel ratio operation conducted for a first time period, followed by a rich air-fuel ratio operation conducted for a second time period, is repeated.

8. An apparatus according to claim 7, wherein the first time period is about two minutes and the second time period is about three seconds.

9. An apparatus according to claim 1, wherein the exhaust gas oxygen concentration control means includes means for continuously decreasing exhaust gas oxygen concentration in order to decrease the exhaust gas oxygen concentration and maintain the decreased oxygen concentration for a predetermined time period.

10. An apparatus according to claim 1, wherein the exhaust gas oxygen concentration control means includes a fuel cutting ceasing means for ceasing fuel cutting when the exhaust gas includes excess oxygen and one of the exhaust gas temperature and the NOx absorbent temperature is high.

11. An apparatus according to claim 10, wherein the condition where fuel cutting is to be conducted is a deceleration condition.

12. An apparatus according to claim 1, wherein the operating condition determining means includes means for determining whether one of a current exhaust gas temperature and an NOx absorbent temperature is within a predetermined temperature range, and wherein the exhaust gas oxygen concentration control means decreases the oxygen concentration only when one of the current exhaust gas temperature and the NOx absorbent temperature is within the predetermined temperature range.

13. An apparatus according to claim 12, wherein the predetermined temperature range is a range of 550° C.-750° C. in exhaust gas temperature and a range of 500° C.-700° C. in NOx absorbent temperature.

14. An apparatus according to claim 1, wherein the operating condition determining means includes means for determining whether one of a current exhaust gas temperature and an NOx absorbent temperature is within a predetermined temperature range, and wherein the exhaust gas oxygen concentration control means includes means for delaying an objective ignition timing when one of the current exhaust gas temperature and the NOx absorbent temperature is within the predetermined temperature range.

15. An apparatus according to claim 14, wherein the predetermined temperature range is a range of 550° C.-750° C. in exhaust gas temperature and a range of 500° C.-700° C. in NOx absorbent temperature.

16. An apparatus according to claim 1, wherein the operating condition detecting means includes a vehicle speed sensor and wherein the operating condition determining means includes means for determining whether or not an exhaust gas or NOx absorbent temperature is high by determining whether a current vehicle speed detected by the vehicle speed sensor is at least as great as a predetermined speed.

17. An apparatus according to claim 1, wherein the predetermined speed is about 100 Km/h.

18. An apparatus according to claim 1, wherein the exhaust gas oxygen concentration control means includes means for modifying a reference temperature for switching an engine operation from a lean air-fuel operation to a rich air-fuel operation so that the higher the temperatures that the NOx absorbent has experienced, the higher the reference temperature is.

19. An apparatus according to claim 1, wherein the exhaust gas oxygen concentration control means includes means for decreasing the exhaust gas oxygen concentration to allow an NOx absorbent temperature to rise when the NOx absorbent temperature exceeds a predetermined temperature, storing a highest temperature that the NOx absorbent experiences, and ceasing the operation of decreasing the exhaust gas oxygen concentration when the NOx absorbent temperature decreases to a temperature lower than the stored highest temperature by a predetermined temperature decrement.

20. An apparatus according to claim 19, wherein the predetermined temperature is about 500° C. and the predetermined temperature decrement is about 50° C.

21. An apparatus according to claim 1, wherein the exhaust gas oxygen concentration control means includes means for ceasing an engine operation at lean air-fuel ratios and for stopping the ceasing of the lean air-fuel ratio operation independently of an NOx absorbent temperature when a predetermined time period has elapsed since the lean air-fuel operation has ceased.

22. An apparatus according to claim 21, wherein the predetermined time period is about ten minutes.

23. An apparatus according to claim 1, wherein the operating condition detecting means includes means for detecting an inlet gas temperature of the NOx absorbent and means for detecting an outlet gas temperature of the NOx absorbent, and wherein the exhaust gas oxygen concentration control means includes means for decreasing the exhaust gas oxygen concentration when the outlet gas temperature of the NOx absorbent exceeds a first predetermined temperature, and wherein the exhaust gas oxygen concentration decreasing operation is stopped when the inlet gas temperature of the NOx absorbent decreases to a temperature below a second predetermined temperature, wherein the second predetermined temperature is lower than the first predetermined temperature.

24. An apparatus according to claim 23, wherein the means for detecting an outlet gas temperature of the NOx absorbent comprises a temperature sensor installed downstream of the NOx absorbent.

25. An apparatus according to claim 23, wherein the first predetermined temperature is about 500° C. and the second predetermined temperature is about 400° C.

* * * * *